United States Patent Office 3,318,905
Patented May 9, 1967

3,318,905
1 - SUBSTITUTED 3-DIALKYLAMINOALKOXY-INDAZOLES AND 1-SUBSTITUTED - 3 - HYDROXY-INDAZOLES
Giuseppe Palazzo, Rome, Italy, assignor to Aziende Chimiche Riunite Angelini Francesco, Rome, Italy, a corporation of Italy
No Drawing. Filed Jan. 2, 1964, Ser. No. 335,424
Claims priority, application Italy, Aug. 9, 1963,
16,898/63
48 Claims. (Cl. 260—310)

The present invention relates to a class of 1-substituted 3-dialkylaminoalkoxy-indazoles having the Formula I

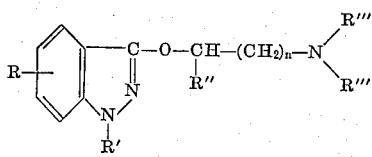
(I)

wherein:
R is a member selected from the class consisting of hydrogen and chlorine;
R' is a member selected from the class consisting of lower alkyl and phenyl groups which latter may be substituted or not in their phenyl nucleus by halogen atoms or lower alkyl or lower alkoxy groups;
R" is a member selected from the class consisting of hydrogen and lower alkyl groups;
R''', which may be like or unlike, are lower alkyl residues;
n is a member selected from the group consisting of 1 and 2.

In the compounds having the general Formula I, it is preferred that R' represents a methyl or ethyl group, a phenyl group, a benzyl, p-chlorobenzyl, p-methoxybenzyl group, or a β-phenylethyl group; that R" represents a methyl group; and that R''' represents a hydrogen or a methyl group.

The compounds having the general Formula I, which can be administered in the form of their salts, such as the hydrochloride, citrate, maleate, or sulfate, are characterized by interesting analgetic and antiphlogistic properties, and a few of them also have a more relaxing activity. 1-benzyl-3-γ-dimethylamino-propoxy-indazole hydrochloride may be mentioned by way of example, which exhibits the following pharmacological properties:

(1) An apparent analgetic activity when tested by the inflammatory pain tests (Randall and Selitto-phenyl-quinone), in which this compound appears to be 3 times as active as acetylsalicyclic acid. Its activity is more moderate when tested by the hot plate test;

(2) A particularly apparent antiphlogistic activity, when tested by the chronic silver nitrate test, in which the compound is three times as active as phenylbutazone;

(3) An activity on polysynaptic spinal responses which is 8 times as high as that of mephenesin.

The compound is free from any central effect in that it does not inhibit conditioned responses, as is often the case with analgetic narcotics of the morphine type.

The compounds having the general Formula I may be prepared, according to a method which is also an object of the invention, from the corresponding 3-hydroxy-indazoles having the general Formula II, which also present a biological activity and are administrable in the form of salts,

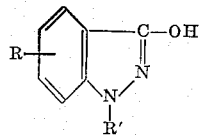
(II)

(wherein R and R' have the above-mentioned meanings), which are converted into the corresponding alkaline salts, preferably into the sodium salts, and reacted with halogeno-alkyl-dialkylamines having the general Formula III, in suitable inert solvents

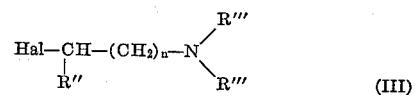
(III)

wherein R", R''' and n have the above-mentioned meanings, while Hal is a halogen atom, preferably a chlorine atom.

The oxy-indazoles having the general Formula II are prepared, according to the invention, from N-substituted anthranilic acids or esters having the general Formula IV; the latter compounds are nitrosated, and the obtained nitroso-derivatives are reduced with sodium hydrosulfite and yield the sodium salts of 3-hydroxy-indazoles (II) directly:

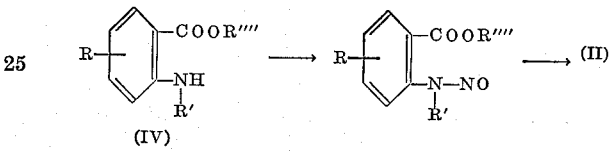

In this reaction sequence, R and R' have the above-mentioned meanings, and R'''' is a member selected from the class consisting of hydrogen and lower alkyl groups. The following examples are given by way of illustration only, and are not limitative of the invention.

EXAMPLE 1

1-methyl-3-hydroxy-1H-indazole (II R=H, R'=CH₃)

175 g. of N-methylanthranilic acid are dissolved into 2 lt. of water and 120 ml. of concentrated HCl. The mixture is cooled, and a concentrated solution of 80 g. of sodium nitrite is slowly added thereto with stirring, while keeping the temperature at about 25° C. The nitroso-derivative is filtered and crystallized from a hydrodioxane mixture, and is then dissolved into a solution of 500 g. of NaOH in 1500 ml. of water. The solution is saturated with nitrogen, 400 g. of sodium hydrosulfite are added thereto, and the mixture is stirred for 6 hours at 75° C. under a nitrogen blanket. It is then diluted with little water until the solids which had separated are completely dissolved, and acidified with 750 ml. of glacial acetic acid. The mixture is cooled, filtered, and 1-methyl-3-hydroxy-indazole is crystallized from water. The compound has a melting point of 154–6° C. The yield is 70%.

EXAMPLE 2

1-benzyl-3-hydroxy-6-chloro-1H-indazole (II R=Cl, R'=CH₂C₆H₅)

32 g. of methyl 4-chloroanthranilate, 26.5 g. of benzyl chloride, and 21 g. of anhydrous sodium acetate are heated to 150° C. for 6 hours with stirring. The mixture is cooled and treated with water and ether. The ethereal extract is washed, dried, and evaporated. 27 g. of a residue are obtained, the yield being 57%. Methyl N-benzyl-4-chloro-anthranilate has M.P. 79° C. 28 g. of this material are treated with 190 ml. of 1:1 HCl and 100 ml. of CHCl₃. A concentrated solution of 7.7 g. of sodium nitrite is slowly added, while cooling externally with water. The mixture is allowed to stand at room temperature for 1 hour, and the organic layer is then recovered. The latter is concentrated to dryness under reduced pressure, and the residue is poured into a solution of 80 g. of NaOH in 400 ml. of water. 100 g. of sodium hydrosulfite are then added in a nitrogen stream, and with stirring. The mixture is stirred at 70° C. for 2 hours, after which period further 30 g. of the hydrosulfite are added and the reaction is completed by heating for additional 3 hours. The reaction mass is then diluted with an equal volume of water, boiled, and filtered. The filtrate is acidified with hydrochloric acid. 1-benzyl-3-hydroxy - 6 - chloro-1H-indazole separates, and is then crystallized from alcohol. Its melting point is 229° C., and the yield is 80%.

EXAMPLE 3

*1-p-chlorobenzyl-3-β-dimethylaminoethoxy-1H-indazole*

12.9 g. of 1-p-chlorobenzyl-3-hydroxy-1H-indazole are dissolved in 250 ml. of hot toluene. 2.2 g. of sodium amide are added, and the mixture is heated for 1 hour with stirring. 10 g. of freshly distilled chloroethyldimethylamine, dissolved in 100 ml. of toluene, are then introduced, and heating and stirring are continued for about 4 hours. The inorganic materials are filtered off, and the mixture is extracted with 2 N hydrochloric acid. The solution is then alkalified with NaOH, extracted with ether, and dried over potassium carbonate. The solvent is removed, and the residue is distilled under reduced pressure. 14 g. of a material, B.P. 185° C./0.1 mm., are obtained. 1-p-chlorobenzyl-3-β-dimethylaminoethoxy-1H-indazole hydrochloride is crystallized from ethyl acetate, and has a melting point of 155° C.

EXAMPLE 4

*1-benzyl-3-γ-dimethylaminopropoxy-6-chloro-1H-indazole*

The sodium salt of 1-benzyl-3-hydroxy-6-chloro-1H-indazole is first of all prepared by dissolving this compound into the equivalent amount of sodium methylate in methanol, and drying under reduced pressure. 15 g. of said salt are thoroughly powdered and suspended into 130 ml. of xylene. A solution of 7 g. of chloropropyldimethylamine in 10 ml. of xylene is then rapidly added. Additional 2 g. of the chlorinated base are added after the mixture has been heated for 2 hours, and a third 2 g. portion is finally added after one additional hour. Heating is continued for 4 more hours. The mixture is then cooled, washed with water, dried, and the solvent is removed. 17 g. of a material, B.P. 197° C./0.5 mm., are obtained upon distillation under reduced pressure. This is found to be 1-benzyl-3-γ-dimethylaminopropoxy-6-chloro-1H-indazole. Its hydrochloride is prepared with an etheral HCl solution, and is crystallized from ethyl acetate additioned with a few drops of ethanol. M.P. 140° C.

The compounds which are hereinafter listed may also be prepared by using the techniques described in the preceding examples.

1 - methyl - 3 - β - dimethylaminoethoxy - 1H - indazole B.P. 115°/0.3 HCl M.P. 161° C.
1 - methyl - 3 - γ - dimethylaminopropoxy - 1H - indazole B.P. 122° C./0.3 HCl M.P. 150° C.
1 - phenyl - 3 - β - dimethylaminoethoxy - 1H - indazole B.P. 190° C./1 HCl M.P. 175° C.
1 - phenyl - 3 - β - diethylaminoethoxy - 1H - indazole B.P. 140° C./0.02 citrate M.P. 75° C.
1 - phenly - 3 - γ - dimethylaminopropoxy - 1H - indazole M.P. 65° C. HCl M.P. 197° C.
1 - benzyl - 3 - β - dimethylaminoethoxy - 1H - indazole B.P. 190° C./1 HCl M.P. 155° C.
1 - benzyl - 3 - β - dimethylaminoethoxy - 1H - indazole B.P. 170° C./0.1 citrate M.P. 104° C.
1 - benzyl - 3 - γ - dimethylaminopropoxy - 1H - indazole B.P. 160° C./0.05 HCl M.P. 160° C., citrate 115–7°, maleate 113° C., sulfate 149° C.
1 - p - chlorobenzyl - 3 - β - diethylaminoethoxy - 1H - indazole B.P. 170° C. /0.2 HCl M.P. 124° C., citrate 93° C.
1 - p - chlorobenzyl - 3 - γ - dimethylaminopropoxy - 1H-indazole B.P. 171° C./0.1 HCl M.P. 120° C.
1 - phenethyl - 3 - β - dimethylaminoethoxy - 1H - indazole B.P. 165° C./0.2 HCl M.P. 181° C.
1 - benzyl - 3 - β - dimethylaminoethoxy - 5 - chloro - 1H-indazole B.P. 176° C./0.2 HCl M.P. 195° C.
1 - p - methoxybenzyl - 3 - β - dimethylaminoethoxy - 1H-indazole B.P. 189° C./0.3 HCl M.P. 215° C.
1 - p - chlorobenzyl - 3 - γ - diethylaminopropoxy - 1H-indazole B.P. 205° C./0.3 HCl M.P. 96° C.
1 - p - methoxybenzyl - 3 - γ - dimethylaminopropoxy-1H-indazole B.P. 200° C./0.4 HCl M.P. 120° C.
1 - benzyl - 3 - γ - dimethylaminopropoxy - 5 - chloro-1H-indazole B.P. 187° C./0.2 HCl M.P. 160° C.
1 - phenethyl - 3 - γ - dimethylaminopropoxy - 1H - indazole B.P. 174° C./0.2 HCl M.P. 173° C.
1 - p - chlorobenzyl - 3 - α - methyl - β - dimethyl - aminoethoxy-1H-indazole B.P. 180° C./0.1 HCl M.P. 178° C.
1 - p - methoxybenzyl - 3 - α - methyl - β - dimethylaminoethoxy-5-chloro-1H-indazole B.P. 198° C./0.2 HCl M.P. 135° C.
1 - p - methoxybenzyl - 3 - γ - dimethylaminopropoxy - 5-chloro-1H-indazole B.P. 220° C./0.5 HCl M.P. 117° C.
1 - p - methoxybenzyl - 3 - β - dimethylaminoethoxy - 5-chloro-1H-indazole B.P. 207° C./0.4 HCl M.P. 130° C.
1 - benzyl - 3 - β - dimethylaminoethoxy - 6 - chloro - 1H-indazole B.P. 180° C./0.2 HCl M.P. 199° C.
1 - benzyl - 3 - γ - methyl - β - dimethylaminoethoxy - 6-chloro-1H-indazole B.P. 187° C./0.2 HCl M.P. 148° C.
1 - butyl - 3 - β - dimethylaminoethoxy - 5 - chloro - 1H-indazole B.P. 173° C./0.3 HCl M.P. 122° C.
1 - butyl - 3 - γ - dimethylaminopropoxy - 5 - chloro - 1H-indazole B.P. 166° C./0.2 HCl M.P. 139° C.
1 - butyl - 6 - chloro - 3 - β - dimethylaminoethoxy - 1H-indazole B.P. 155° C./0.5.
1 - benzyl - 3 - γ - dimethylaminopropoxy - 4 - chloro - 1H-indazole B.P. 188° C./0.2 HCl M.P. 160° C.
1 - p - chlorobenzyl - 3 - β - dimethylaminoethoxy - 6-chloro-1H-indazole B.P. 193° C./0.5 HCl M.P. 190° C.
1 - p - chlorobenzyl - 3 - γ - dimethylaminopropoxy - 6-chloro-1H-indazole B.P. 197° C./0.3 HCl M.P. 173° C.
1 - m - chlorobenzyl - 3 - γ - dimethylaminopropoxy - 1H-indazole B.P. 195° C./0.5 HCl M.P. 97° C.
1 - o - chlorobenzyl - 3 - γ -dimethylaminopropoxy - 1H-indazole B.P. 185° C./0.2 HCl M.P. 140° C.
1 - (m,p - dimethoxybenzyl) - 3 - γ - dimethylaminopropoxy-1H-indazole B.P. 209° C./0.3 HCl M.P. 111° C.

The following intermediate compounds have also been obtained:

1-p-chlorobenzyl-3-hydroxy-1H-indazole M.P. 178° C.
1-p-methoxybenzyl-3-hydroxy-1H-indazole M.P. 161° C.
1-phenethyl-3-hydroxy-1H-indazole M.P. 145° C.
N-nitroso-N-benzyl-anthranilic acid M.P. 120° C. (dec.)
1-benzyl-3-hydroxy-5-chloro-1H-indazole M.P. 213° C.
1-benzyl-3-hydroxy-6-chloro-1H-indazole M.P. 229° C.
1-p-methoxyphenyl-3-hydroxy-1H-indazole M.P. 160° C.
1-p-methoxybenzyl-3-hydroxy-5-chloro-1H-indazole M.P. 199° C.
1-m-chlorobenzyl-3-hydroxy-1H-indazole M.P. 151° C.
1-p-chlorobenzyl-3-hydroxy-6-chloro-1H-indazole M.P. 236° C.
1-o-chlorobenzyl-3-hydroxy-1H-indazole M.P. 231° C.
1-benzyl-3-hydroxy-4-chloro-1H-indazole M.P. 223° C.
1-m.p.dimethoxybenzyl-3-hydroxy-1H-indazole M.P. 166° C.
1-butyl-3-hydroxy-6-chloro-1H-indazole M.P. 171° C.
1-butyl-3-hydroxy-5-chloro-1H-indazole M.P. 120° C.
N-benzyl-4-chloro-anthranilic acid M.P. 171° C.
3,4-dimethoxybenzylamino-carbamoyl chloride M.P. 129° C.

What I claim is:
1. 1-substituted 3 - dialkylamino-alkoxy-indazole of the Formula I

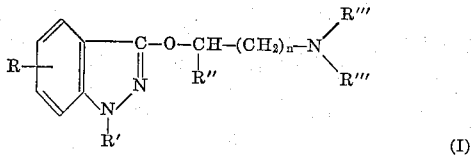

(I)

wherein:

R is a member selected from the class consisting of hydrogen and chlorine;
R' is a member selected from the class consisting of lower alkyl groups, phenyl, phenethyl and benzyl which latter may be substituted or not in the phenyl nucleus by halogen atoms or lower alkyl or lower alkoxy groups;
R'' is a member selected from the class consisting of hydrogen and lower alkyl groups;
R''', which may be like or unlike, are lower alkyl groups;
$n$ is 1 or 2.

2. 1 - p - cholorbenzyl - 3 - β-dimethylaminoethoxy-1H-indazole, or a non-toxic salt thereof.
3. 1 - benzyl - 3-γ-dimethylaminopropoxy-6-chloro-1H-indazole, or a non-toxic salt thereof.
4. 1 - methyl-3-β-dimethylaminoethoxy-1H-indazole or a non-toxic salt thereof.
5. 1-methyl-3-γ-dimethylaminopropoxy-1H-indazole or a non-toxic salt thereof.
6. 1-phenyl-3-β-dimethylaminoethoxy-1H-indazole or a non-toxic salt thereof.
7. 1 - phenyl - 3-β-diethylaminoethoxy-1H-indazole or a non-toxic salt thereof.
8. 1-phenyl-3-γ-dimethylaminopropoxy-1H-indazole, or a non-toxic salt thereof.
9. 1-benzyl-3-β-dimethylaminoethoxy-1H-indazole or a non-toxic salt thereof.
10. 1 - benzyl-3-β-diethylaminoethoxy-1H-indazole or a non-toxic salt thereof.
11. 1 - benzyl-3-γ-dimethylaminopropoxy-1H-indazole, or a non-toxic salt thereof.
12. 1 - p - chlorobenzyl - 3 - β-diethylaminoethoxy-1H-indazole, or a non-toxic salt thereof.
13. 1 - p - chlorobenzyl-3-γ-dimethylaminopropoxy-1H-indazole, or a non-toxic salt thereof.
14. 1 - phenethyl - 3 - β-dimethylaminoethoxy-1H-indazole, or a non-toxic salt thereof.
15. 1 - benzyl - 3-β-dimethylaminoethoxy-5-chloro-1H-indazole, or a non-toxic salt thereof.
16. 1 - p-methoxybenzyl-3-β-dimethylaminoethoxy-1H-indazole, or a non-toxic salt thereof.
17. 1 - p - chlorobenzyl - 3-γ-diethylaminopropoxy-1H-indazole, or a non-toxic salt thereof.
18. 1 - p - methoxybenzyl - 3-γ-dimethylaminopropoxy-1H-indazole, or a non-toxic salt thereof.
19. 1 - benzyl-3-γ-dimethylaminopropoxy-5-chloro-1H-indazole, or a non-toxic salt thereof.
20. 1 - phenethyl - 3-γ-dimethylaminopropoxy-1H-indazole, or a non-toxic salt thereof.
21. 1 - p - chlorobenzyl - 3-α-methyl-β-dimethylaminoethoxy-1H-indazole, or a non-toxic salt thereof.
22. 1 - p - methoxybenzyl-3-α-methyl-β-dimethylaminoethoxy-5-chloro-1H-indazole, or a non-toxic salt thereof.
23. 1 - p - methoxybenzyl-3-γ-dimethylaminopropoxy-5-chloro-1H-indazole, or a non-toxic salt thereof.
24. 1 - p - methoxybenzyl-3-β-dimethylaminoethoxy-5-chloro-1H-indazole, or a non-toxic salt thereof.
25. 1 - benzyl - 3-β-dimethylaminoethoxy-6-chloro-1H-indazole, or a non-toxic salt thereof.
26. 1 - benzyl - 3 - α-methyl-β-dimethylaminoethoxy-6-chloro-1H-indazole, or a non-toxic salt thereof.
27. 1-butyl-3-β-dimethylaminoethoxy-5-chloro-1H - indazole, or a non-toxic salt thereof.
28. 1-butyl-3-α-dimethylaminopropoxy-5-chloro-1H - indazole, or a non-toxic salt thereof.
29. 1-butyl-6-chloro-3-β-dimethylaminoethoxy-1H - indazole, or a non-toxic salt thereof.
30. 1-benzyl-3-γ-dimethylaminopropoxy-4-chloro - 1H-indazole, or a non-toxic salt thereof.
31. 1-p-chlorobenzyl-3-β-dimethylaminoethoxy-6 - chloro-1H-indazole, or a non-toxic salt thereof.
32. 1-p-chlorobenzyl-3 - α-dimethylaminopropoxy - 6-chloro-1H-indazole, or a non-toxic salt thereof.
33. 1-m-chlorobenzyl-3-γ-dimethylaminopropoxy - 1H-indazole, or a non-toxic salt thereof.
34. 1-o-chlorobenzyl-3-α-dimethylaminopropoxy - 1H-indazole, or a non-toxic salt thereof.
35. 1-(m.p. dimethoxybenzyl) - 3 - γ - dimethylaminopropoxy-1H-indazole, or a non-toxic salt thereof.
36. 1-p-chlorobenzyl-3-hydroxy-1H-indazole.
37. 1-p-methoxybenzyl-3-hydroxy-1H-indazole.
38. 1-benzyl-3-hydroxy-5-chloro-1H-indazole.
39. 1-benzyl-3-hydroxy-6-chloro-1H-indazole.
40. 1-p-methoxy-phenyl-3-hydroxy-1H-indazole.
41. 1-p-methoxybenzyl-3-hydroxy-5-chloro-indazole.
42. 1-p-chlorobenzyl-3-hydroxy-6-chloro-indazole.
43. 1-benzyl-3-hydroxy-4-chloro-indazole.
44. 1-butyl-3-hydroxy-5-chloro-indazole.
45. 1-m-chlorobenzyl-3-hydroxy-1H-indazole.
46. 1-o-chlorobenzyl-3-hydroxy-1H-indazole.
47. 1-m.p. dimethoxybenzyl-3-hydroxy-1H-indazole.
48. 1-butyl-3-hydroxy-6-chloro-1H-indazole.

References Cited by the Examiner

UNITED STATES PATENTS

| | | | | |
|---|---|---|---|---|
| 2,960,536 | 11/1960 | Getz | | 260—583 |
| 2,964,402 | 12/1960 | Jennen et al. | | 260—310 |
| 3,102,887 | 9/1963 | Thatcher | | 260—569 |
| 3,133,081 | 5/1964 | Lafferty | | 260—310 |

OTHER REFERENCES

Janssen: Proc. Intern. Meeting Mol. Spectry, 4th Bologna, 1959, vol. 2, pages 820–22 relied on (1962). From Adv. in Mol. Spect.

Kochetkov et al.: Zhurnal Obshckei Khimii, vol. 31, pages 201–4 (1961).

Noller: Chemistry of Organic Compounds, 2nd Ed., page 137, Philadelphia, Saunders, 1957.

Overberger et al.: Jour. Org. Chem., vol. 22, pages 858–9 (1957).

Stollé: Jour. Praktische Chemie, vol. 117, pages 192–3 (1927).

WALTER A. MODANCE, *Primary Examiner.*

JOHN D. RANDOLPH, *Examiner.*

NATALIE TROUSOF, *Assistant Examiner.*